(12) United States Patent
Gupta et al.

(10) Patent No.: US 10,061,603 B2
(45) Date of Patent: Aug. 28, 2018

(54) METHOD AND APPARATUS FOR DYNAMIC ROUTING OF USER CONTEXTS

(71) Applicant: AT&T Intellectual Property I, L.P., Atlanta, GA (US)

(72) Inventors: Gaurav Gupta, Sammamish, WA (US); Vivek Mhatre, Bellevue, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 140 days.

(21) Appl. No.: 14/964,241

(22) Filed: Dec. 9, 2015

(65) Prior Publication Data

US 2017/0168863 A1    Jun. 15, 2017

(51) Int. Cl.
*G06F 9/455*   (2018.01)
*G06F 9/50*    (2006.01)

(52) U.S. Cl.
CPC ........ *G06F 9/45558* (2013.01); *G06F 9/5083* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 6,944,699 B1 | 9/2005 | Bugnion et al. | |
| 8,261,054 B2 | 9/2012 | Smith | |
| 8,261,284 B2 | 9/2012 | Loeser | |
| 8,468,533 B2 | 6/2013 | Miyazaki et al. | |
| 8,522,253 B1 | 8/2013 | Rozas et al. | |
| 9,075,643 B2 | 7/2015 | Heninger et al. | |
| 2005/0132363 A1 | 6/2005 | Tewari et al. | |
| 2008/0072222 A1* | 3/2008 | Bantz | G06F 8/60 718/1 |
| 2010/0293543 A1 | 11/2010 | Erhart et al. | |
| 2012/0311578 A1* | 12/2012 | Hara | G06F 9/4445 718/1 |
| 2014/0259012 A1 | 9/2014 | Nandlall et al. | |
| 2015/0052521 A1* | 2/2015 | Raghu | H04L 63/0272 718/1 |
| 2015/0052524 A1 | 2/2015 | Raghu | |
| 2015/0309820 A1 | 10/2015 | Pearson | |

OTHER PUBLICATIONS

Dong, YaoZu, "A Virtualization Solution for BYOD with Dynamic Platform Context Switch". 2015. pp. 1-6.

* cited by examiner

*Primary Examiner* — Kenneth Tang

(57) ABSTRACT

In one example, a method and apparatus for dynamic routing of user contexts are disclosed. In one example, a method for supporting a context associated with a connection between a user and a first virtual machine of a virtual function includes receiving a notification of a change in a behavior of the user that affects the context, wherein the context is supported by the first virtual machine of the virtual function, and reassigning the context to a second virtual machine of the virtual function, different from the first virtual machine, based at least in part on the change in the behavior.

20 Claims, 6 Drawing Sheets

METHOD AND APPARATUS FOR DYNAMIC ROUTING OF USER CONTEXTS

The present disclosure relates to a method and apparatus for dynamically routing user contexts among a set of service-optimized virtual machines that are each configured to support a limited set of services or actions.

BACKGROUND

Virtualization and cloud technology have allowed for the rapid deployment of new services, as well as on-demand scaling of server capacity for these services. For example, a virtual application hosted in the cloud can easily add capacity by provisioning additional virtual machines to accommodate additional requests for services.

SUMMARY OF THE DISCLOSURE

In one example, a method and apparatus for dynamic routing of user contexts are disclosed. In one example, a method for supporting a context associated with a connection between a user and a first virtual machine of a virtual function includes receiving a notification of a change in a behavior of the user that affects the context, wherein the context is supported by the first virtual machine of the virtual function, and reassigning the context to a second virtual machine of the virtual function, different from the first virtual machine, based at least in part on the change in the behavior.

In another example, a non-transitory computer-readable storage device stores a plurality of instructions which, when executed by a processor, cause the processor to perform operations for supporting a context associated with a connection between a user and a first virtual machine of a virtual function. The operations include receiving a notification of a change in a behavior of the user that affects the context, wherein the context is supported by the first virtual machine of the virtual function and reassigning the context to a second virtual machine of the virtual function, different from the first virtual machine, based at least in part on the change in the behavior.

In another example, a system includes a plurality of virtual machines, wherein each of the plurality of virtual machines is configured to support a limited number of services, and a controller for monitoring a context associated with a connection between a user and a first one of the plurality of virtual machines that is associated with a virtual function and for assigning the context to a second one of the plurality of virtual machines that is associated with the virtual function based on a current user behavior associated with the context.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
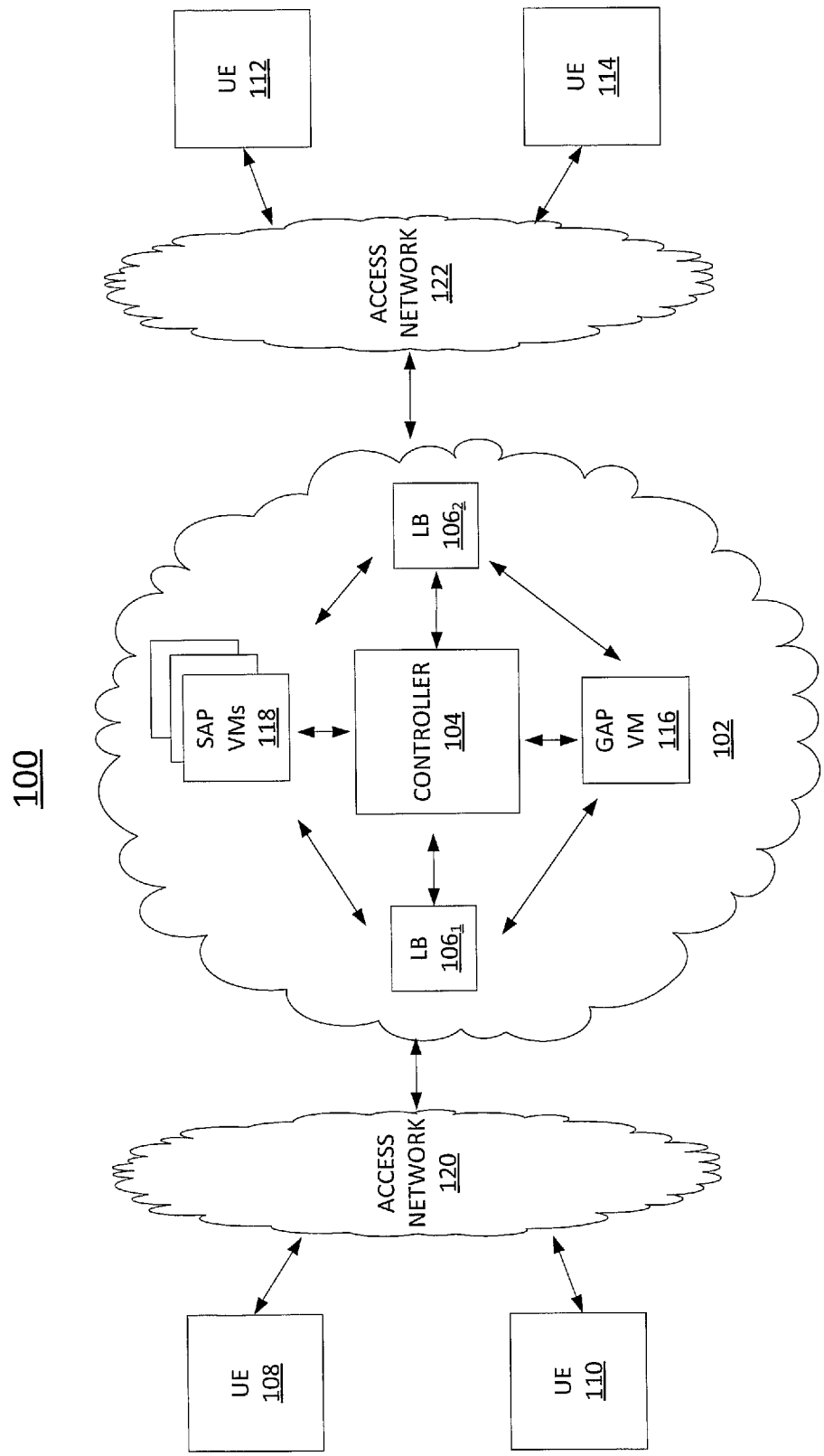
FIG. 1 is a block diagram depicting one example of a communications network.

Virtualization and cloud technology have allowed for the rapid deployment of new services and applications. In general, a virtual environment behaves similarly to a physical computer or server. A virtual machine (VM) including all of the resources of a physical server (e.g., memory, central processing unit, interfaces, ports, etc.) is provisioned, e.g., by a hypervisor. The resources of the VM may then be partitioned and allocated to serve one or more applications or services. When an application needs to add capacity, a new VM (or partition of a VM) is provisioned. For simplicity's sake, all of the VMs that handle user sessions for a particular application are usually identical in terms of software feature functionality, parameter settings, resources, and the like. This simplifies the provisioning of new VMs, since only a single VM image needs to be stored and used as a basis for provisioning.

Although this process simplifies the scaling of applications, it may ultimately result in waste, by provisioning resources in excess of what is needed. User behavior tends to change dynamically over time, based, for example, on the services being used, user mobility patterns, time of day, and other factors. For instance, a Voice over Long Term Evolution (VoLTE) call may invoke different signaling call flows and data traffic than a high-bandwidth download or a streaming music application. When a user initiates a connection to a VM to use an application, he is assigned a context, e.g., a name-value pair, which describes the client-server connection. The context may include authentication data, session management data, access control data, data flow information, or other data. Typically, once a user's context is assigned to a VM, the context is resident on that VM until terminated (e.g., by the user logging out). Thus, the VM (and any replicas) must support all of the features and functionality needed to support each application used by the user.

The present disclosure broadly describes a method, a computer-readable storage device, and an apparatus for dynamically re-routing contexts to virtual machines. Examples of the present disclosure employ a plurality of virtual machines that are each dedicated or optimized for a different application or service. For instance, a first VM could be provisioned and configured to only support contexts using VoLTE, a second VM could be provisioned and configured to only support contexts using streaming music applications, a third VM could be provisioned and configured to only support contexts performing high-bandwidth downloads, and the like. A controller monitors the contexts and re-routes the contexts, when necessary, to the appropriate VMs. In this way, contexts can be routed and re-routed as necessary to VMs that are specifically configured for supporting the application or service that is currently in use by the context.

Within the context of the present disclosure, the term "virtual function" (or "VF") is understood to refer to any type of function that can be deployed in a virtualized infrastructure, e.g., virtual network functions (VNFs), virtual application functions (VAFs), virtual firewall functions (VFFs), etc. VNFs include transport and forwarding functions controlled by a software defined networking (SDN) controller. VAFs can include web servers, media servers, mail servers, content servers, and the like controlled by an application controller.

FIG. 1 is a block diagram depicting one example of a communications network 100. The communications network 100 may be any type of communications network, such as for example, a traditional circuit switched network (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one example, the network 100 may comprise a core network 102. The core network 102 may be in communication with one or more access networks 120 and 122. The access networks 120 and 122 may include a wireless access network (e.g., a wireless fidelity (WiFi) network and the like), a mobile or cellular access network, a PSTN access network, a cable access network, a wired access network and the like. In one example, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the core network 102 may include a dynamic context distribution controller 104, one or more load balancers $106_1$-$106_n$ (hereinafter collectively referred to as "load balancers 106"), a general application processing (GAP) VM 116, and a set of specialized application processing (SAP) VMs 118. It should be noted that any number of controllers 104, load balancers (LBs) 106, or VMs 116 or 118 may be deployed.

In one example, the controller 104 comprises a computer or server that maintains rules and policies for dynamically routing and re-routing contexts across the GAP VM 116 and the SAP VMs 118. The controller 104 uses these rules and policies, as well as utilization information provided by the load balancers 106, to map and re-assign contexts to the most appropriate SAP VMs 118. The controller 104 also informs the load balancers 106 when contexts are routed or re-routed, so that the traffic of each user is always directed by the load balancers to the VM that is hosting that user's context, and also so that the load balancers 106 can provide the most up-to-date utilization information for future contexts. The controller 104 may be configured as a computer similar to that illustrated in FIG. 4 and described in greater detail below.

In one example, the GAP VM 116 may comprise a web server that is configured and connected to support a plurality of services and actions (e.g., VoLTE calling, streaming music or video, emergency services, mobility, etc.). In another example, the GAP VM is not configured or connected to support any services or actions, but merely serves as a default VM for idle contexts.

In one example, each of the SAP VMs 118 may comprise a service-optimized VM that is uniquely configured and connected to support a limited set of specific services or actions by functioning as a particular network element (e.g., a VoLTE-optimized mobility management entity VM, an e-911-optimized packet-gateway VM, etc.). In one example, at least one of the SAP VMs 118 is configured to support a single service or action. This may include running specialized software, connecting to external nodes in a unique manner, and/or implementing protocols and application parameters that are configured in a custom manner. Some examples of specialized software and corresponding use cases are discussed in further detail below. Thus, the configuration and connectivity will differ from SAP VM 118 to SAP VM 118. For example, an SAP VM 118 configured to support VoLTE calls might include a longer session initiation protocol (SIP)/REGISTER timer than an SAP VM 118 configured to support highly mobile contexts. Each SAP VM 118 may therefore be considered a "lightweight" version of the GAP VM 116 in the sense that each SAP VM 118 is configured to support fewer services or actions than the GAP VM 116.

In one example, all VMs, including the GAP VM 116 and the SAP VMs 118 are instantiated within the context of a VNF (e.g., network element) and include an agent function that communicates with the controller 104 to manage assignments of contexts in real time.

In one example, the load balancers 106 each maintain a mapping of contexts to VMs 116 and/or 118. This allows the load balancers 106 to always direct the traffic to each user to the VM that is hosting that user's context, and to monitor the utilization of each VM, i.e., GAP VM 116 and SAP VMs 118. This utilization information may be provided to the controller 104 to assist in the selection of VMs for dynamic context routing. In a further example, the core network 102 includes multiple GAP VMs such as the GAP VM 116, and the load balancers 106 may distribute network traffic among the multiple GAP VMs according to a set of predefined rules.

In one example, the access networks 120 and 122 may be in communication with one or more user endpoint devices (also referred to as "endpoint devices" or "UE") 108, 110, 112, and 114. In one example, the user endpoint devices 108, 110, 112 and 114 may be any type of endpoint device such as a desktop computer or a mobile endpoint device such as a cellular telephone, a smart phone, a tablet computer, a laptop computer, a netbook, an ultrabook, a tablet computer, a portable media device (e.g., an MP3 player), a gaming console, a portable gaming device, and the like. Any of the user endpoint devices 108, 110, 112, and 114 may be configured as a computer similar to that illustrated in FIG. 4 and described in greater detail below. It should be noted that although only four user endpoint devices are illustrated in FIG. 1, any number of user endpoint devices may be deployed.

It should also be noted that the network 100 has been simplified. For example, the network 100 may include other network elements (not shown) such as border elements, routers, switches, policy servers, security devices, firewalls, a content distribution network (CDN) and the like.

In one example, the elements illustrated within the core network 102 of FIG. 1 represent a single VF or network element. In this case, each VF or network element (e.g., mobility management entity (MME), serving gateway (SGW), packet data network gateway (PGW), or the like) includes a dynamic context distribution controller, one or more load balancers, one or more GAP VMs, and a plurality of SAP VMs as illustrated in FIG. 1. Each of the VFs functions independently in this case, and can make an independent decision to move a context from one VM within its domain to another VM within its domain, regardless of the routing decisions made by other VFs.

Figure 2A:
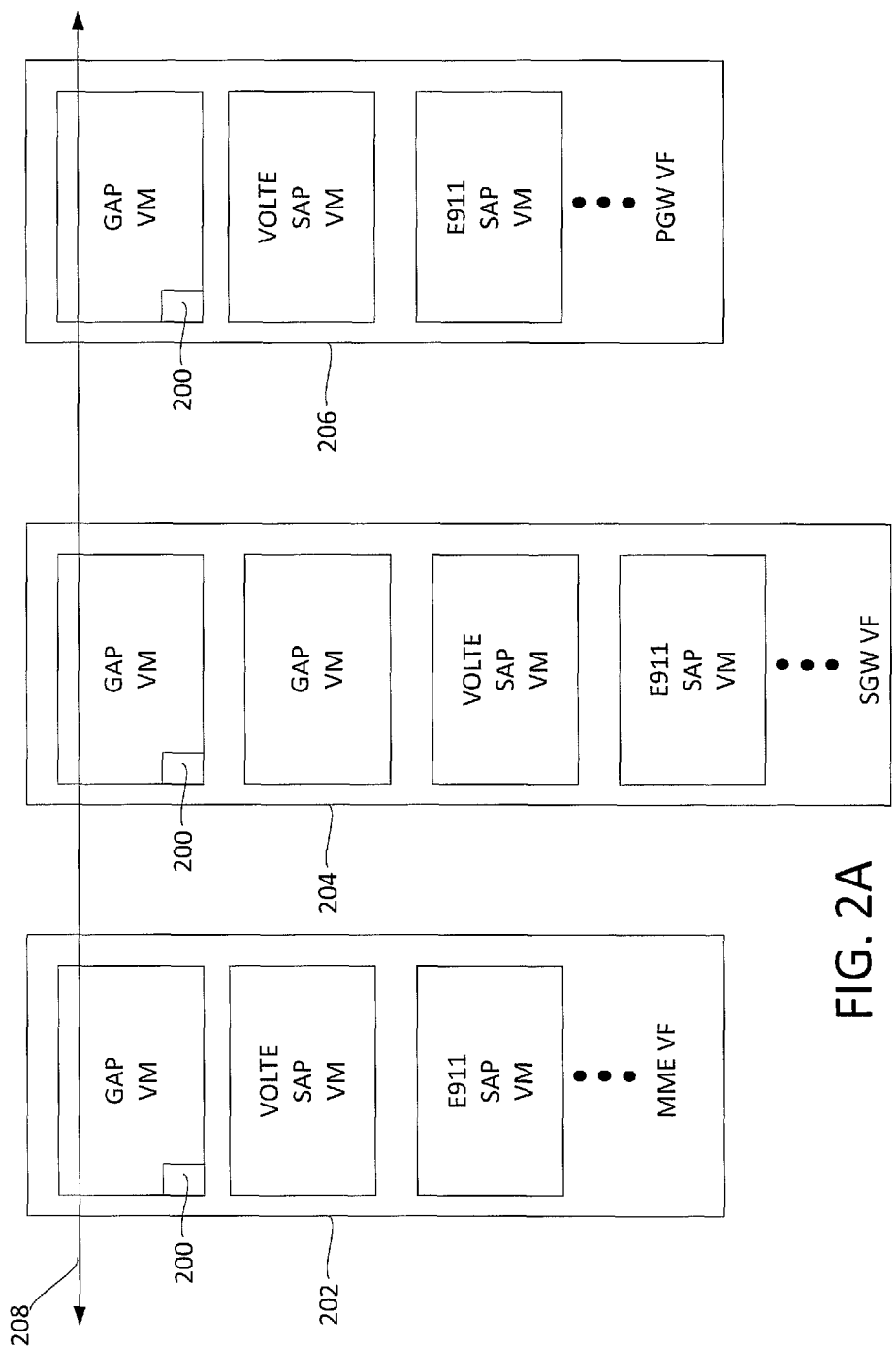
FIGS. 2A-2C illustrate an example user context and the logical path that the user context may take through a plurality of example virtual functions under different circumstances.
Figure 2B:
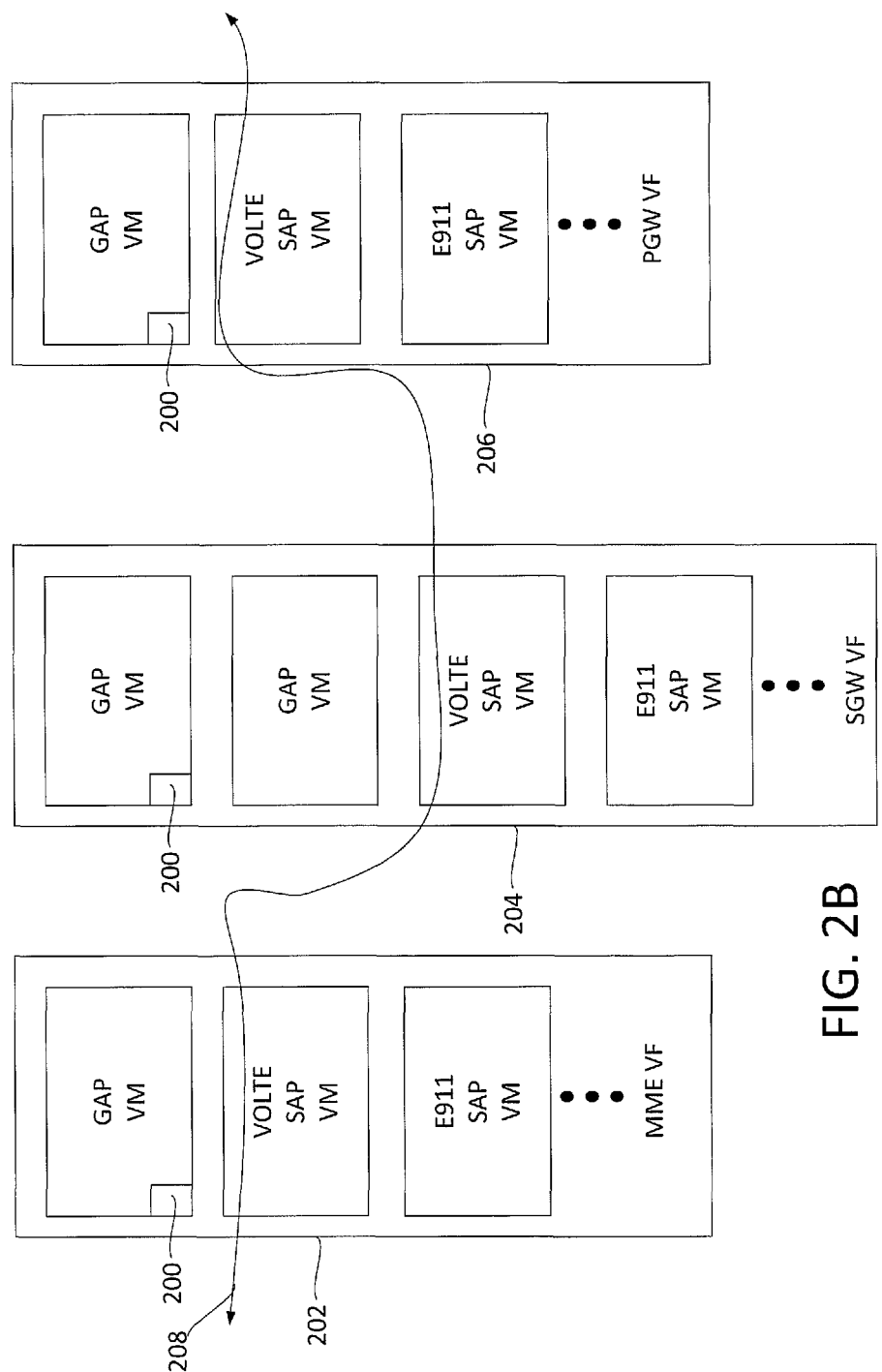
Figure 2C:
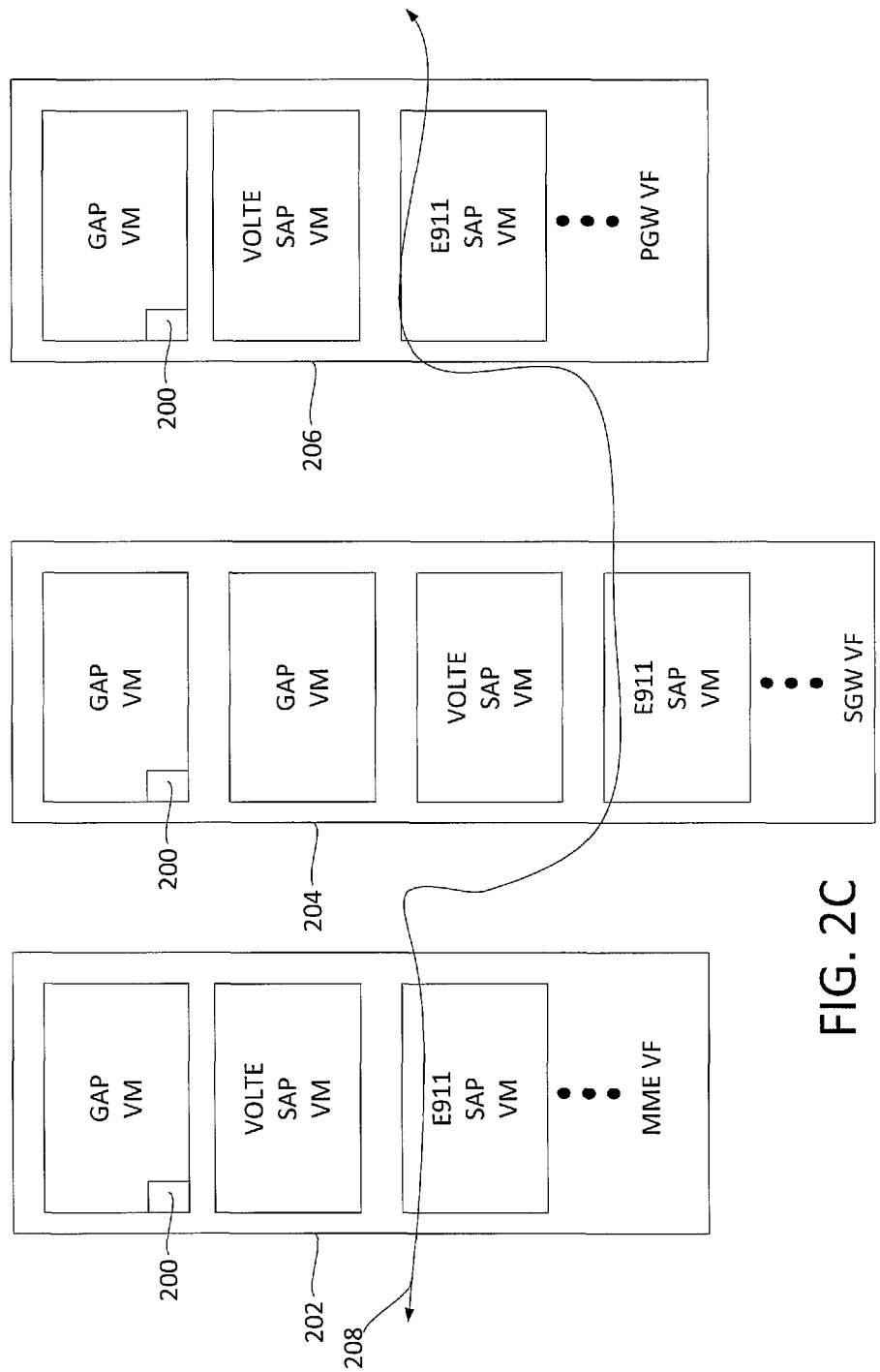

FIGS. 2A-2C, for example, illustrate an example user context 200 and the logical path 208 that the user context 200 may take through a plurality of example VFs under different circumstances. The example VFs include an MME VF 202, an SGW VF 204, and a PGW VF 206. As illustrated, each VF includes at least one GAP VM and a plurality of SAP VMs (e.g., VoLTE SAP VMs, e-911 SAP VMs, etc.). Each VF need not necessarily contain the same number of GAP VMs or SAP VMs, and each VF need not necessarily contain the same types of SAP VMs. Each of the VFs 202-206 further includes a dynamic context distribution controller and one or more load balancers as illustrated in FIG. 1; however, the controller and load balancers are not illustrated in FIGS. 2A-2C for the sake of simplicity.

If the user context 200 is idle, or if the user is browsing the Internet, then each VF 202-206 may simply assign the user context 200 to one of its GAP VMs as it operates to support the user context 200. This example case is illustrated in FIG. 2A. However, if the user initiates a VoLTE call, then the resultant change in user context 200 may prompt each of the VFs 202-206 to independently reassign (e.g., via a respective controller) the user context 200 to an SAP VM that is service-optimized for VoLTE, as illustrated in FIG. 2B. If, on the other hand, the user initiates an e-911 call, then the resultant change in user context 200 may prompt each of the VFs 202-206 to independently reassign (e.g., via a respective controller) the user context 200 to an SAP VM that is service-optimized for e-911, as illustrated in FIG. 2C.

In some cases, a VF (e.g., VF 202, 204, or 206) may not include an SAP VM that is service-optimized for a particular service or action. For instance, a VF may not include an SAP VM that is service-optimized for VoLTE. In this case, the VF may assign the user context 200 to one of its GAP VMs.

Figure 3:
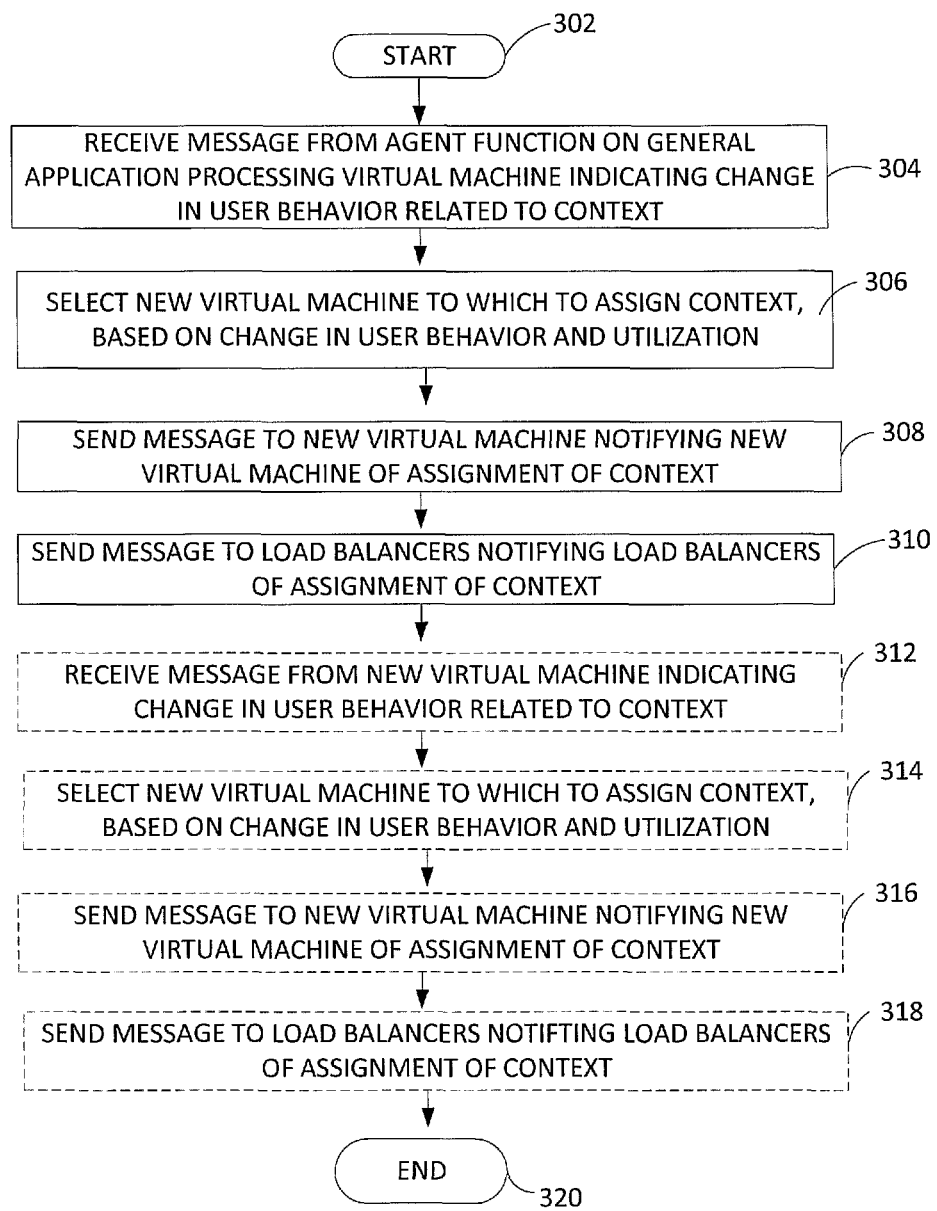
FIG. 3 illustrates a flowchart of an example method of the present disclosure for dynamically routing user contexts.

FIG. 3 illustrates a flowchart of an example method 300 of the present disclosure for dynamically routing user contexts. The method 300 may be implemented, for example, on a dynamic context distribution controller of a VF, such as the controller 104 of FIG. 1. As such, reference is made in the discussion of the method 300 to various elements of FIG. 1. However, it will be understood that implantation of the method 300 is not limited to the configuration illustrated in FIG. 1.

The method 300 begins in step 302. In step 302, it is assumed that a context has already been instantiated for a session initiated by a user, and that the context has been routed by one of the load balancers 106 to a GAP VM 116 according to one or more predefined rules.

In step 304, the controller 104 receives a message from the agent function on the GAP VM 116 indicating a change in user behavior related to the context. The change in the user behavior may include, for example, a new invocation of an on-demand application or a change in the user's mobility pattern. For instance, a previously idle mobile phone associated with the context may have been used to initiate a VoLTE call.

In step 306, the controller 104 selects a new VM to which to assign the context, based on the change in user behavior and utilization. In one example, the new VM is one of the SAP VMs 118 which is service-optimized to support the specific service or action invoked by the change in context. For instance, continuing the above example, if the change in the user behavior indicates that the user has initiated a VoLTE call, the controller 104 may determine that the context should be re-assigned from the GAP VM 116 to an SAP VM 118 that is configured as a VoLTE-optimized mobility management entity VM. In one example, the new VM is selected in accordance with utilization information obtained from the load balancers 106.

In step 308, the controller 104 sends a message to the new VM, e.g., via the agent function residing on the new VM, notifying the new VM of the re-assignment of the context. For instance, continuing the above example, the controller 104 may send a message to the agent function of the SAP VM 118 that is configured as a VoLTE-optimized mobility management entity VM.

In step 310, the controller 104 sends a message to the load balancers 106 notifying the load balancers of the re-assignment of the context to the new VM. This allows the load balancers 106 to update the mapping of contexts to VMs for the purposes of monitoring utilization.

In optional step 312 (illustrated in phantom), the controller 104 receives a message from the agent function on the new VM indicating a change in user behavior related to the context. For instance, continuing the example above, the mobile phone that was previously used to make a VoLTE call may have been used to initiate an e-911 call, or may have gone idle.

In optional step 314 (illustrated in phantom), the controller 104 selects a new VM to which to assign the context, based on the change in user behavior and utilization. In one example, the new VM is one of the SAP VMs 118 which is service-optimized to support the specific service or action invoked by the change in context. For instance, continuing the above example, if the change in the user behavior indicates that the user has initiated an e-911 call, the controller 104 may determine that the context should be re-assigned from an SAP VM 118 that is configured as a VoLTE-optimized mobility management entity VM to another SAP VM 118 that is configured as an e-911-optimized packet-gateway VM. Alternatively, if the change in user behavior indicates that the mobile phone has gone idle, the controller 104 may determine that the context should be re-assigned from an SAP VM 118 to the GAP VM 116. In one example, the new VM is selected in accordance with utilization information obtained from the load balancers 106.

In optional step 316 (illustrated in phantom), the controller 104 sends a message to the new VM, e.g., via the agent function residing on the new VM, notifying the new VM of the re-assignment of the context. For instance, continuing the above example, the controller 104 may send a message to the agent function of the SAP VM 118 that is configured as an e-911-optimized packet-gateway VM.

In optional step 318 (illustrated in phantom), the controller 104 sends a message to the load balancers 106 notifying the load balances of the re-assignment of the context to the new VM.

The method 300 ends in step 320. In addition, although not specifically specified, one or more steps, functions or operations of the method 300 may include a storing, displaying and/or outputting step as required for a particular application. In other words, any data, records, fields, and/or intermediate results discussed in the method 300 can be stored, displayed, and/or outputted either on the device executing the respective method or to another device, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step.

Moreover, steps, blocks, functions, or operations of the above described method 300 can be combined, separated, omitted, and/or performed in a different order from that described above, without departing from the examples of the present disclosure.

It should be noted that the method 300 may re-assign the context to a new VM (e.g., GAP VM 116 and/or a SAP VM 118) any number of times, depending upon the changes in user activity while the context is active. Thus, FIG. 3 is not intended to limit the number of times that a context may be re-assigned from one VM to another.

The method 300 may be performed independently by the dynamic context distribution controller of each VF. Thus, the method 300 may be used to re-route a user context from one VM to another. The re-routing may involve routing the context from a GAP VM 116 to a SAP VM 118, from a first SAP VM 118 to a second SAP VM 118, or from a SAP VM 118 to the GAP VM 116, depending on the user activity and/or VM utilization.

The disclosed examples enhance network resource efficiency and scalability. The service-optimized specialized application processing VMs can be provisioned with "lightweight" sets of resources that support limited services or actions, so that the provisioning of unnecessarily redundant resources is minimized and support for the limited services of actions is optimized. User contexts may be dynamically mapped to virtual machines based on activity and on-demand service. This also allows the services to be scaled independently. For example, the most frequently used services can be scaled out without affecting services that are used less frequently.

As discussed above, embodiments of the disclosure also allow SAP VMs to be specially configured and loaded with specialized software to support particular on-demand services that may be triggered by user behaviors. These specialized SAP VMs can be custom and light weight (e.g., relative to GAP VMs and/or non-specialized SAP VMs). Specialized SAP VMs can be implemented for end-to-end delivery, e.g., such that each network function utilizes real-time user or device behavior (e.g., mobility and/or on-demand application and service usage) to re-assign contexts to specialized virtual machines. This can enhance the user experience, because specialized SAP VMs can host contexts of unified service and/or mobility types.

Moreover, the configuration parameters for the specialized SAP VMs can be fine-tuned for the service and/or mobility type supported. Network operators or suppliers can also choose to add unique functionality applicable to a particular service or mobility type, which might not be applicable to other service or mobility types.

From a service provider perspective, the use of specialized SAP VMs can reduce the costs of operation. In one example, internal procedures can be synchronized using specialized SAP VMs so that the variability of CPU load is reduced.

In another example, software upgrades and buyout costs can also be implemented more discretely (per service type), which will benefit operators and suppliers in price negotiations.

In another example, the use of specialized SAP VMs running specialized software can be used to simplify billing procedures for service providers. For instance, a third-party on-demand service such as a video calling service can be billed directly to the service provider based on the number of specialized SAP VMs used in the end-to-end delivery process.

In another example, return on investment (ROI) calculations for the introduction of new services can be made more discretely and more easily. This will help service providers to prioritize the deployment of and investment in high return/high margin services.

Figure 4:
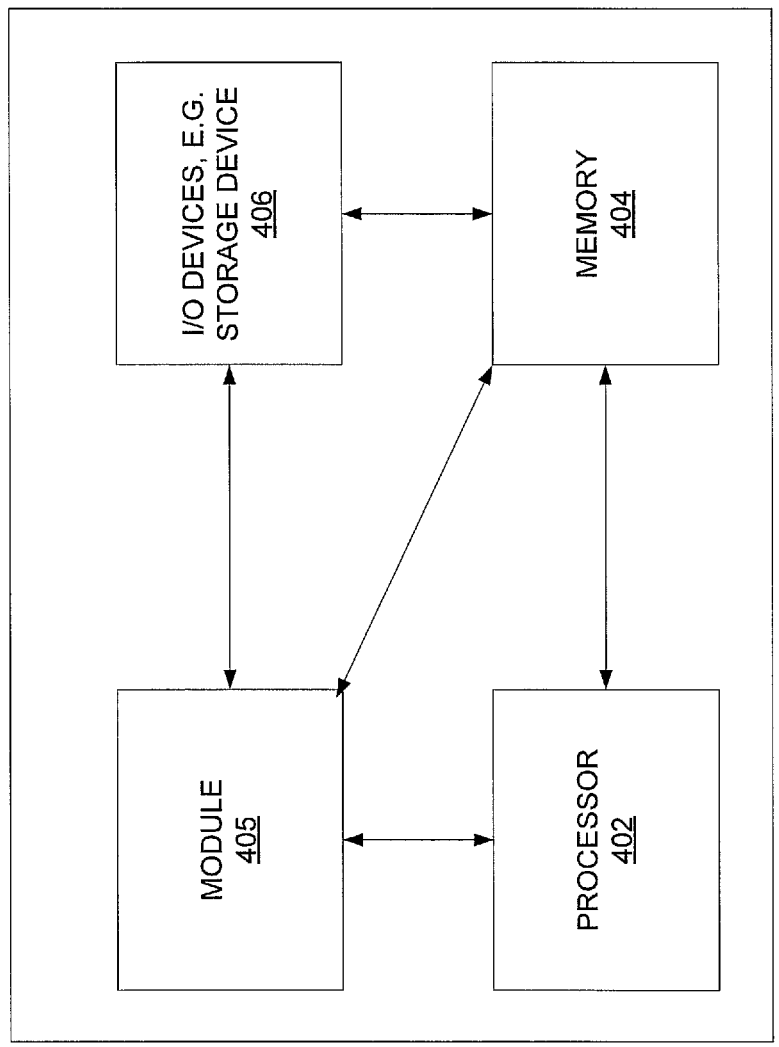
FIG. 4 depicts a high-level block diagram of a computer suitable for use in performing the functions described herein.

FIG. 4 depicts a high-level block diagram of a computer 400 suitable for use in performing the functions described herein. In one example, the computer 400 is configured to operate as a dynamic context distribution controller, such as the controller 104 of FIG. 1. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for dynamic context distribution, and various input/output (I/O) devices 406 (e.g., storage devices, including but not limited to, a tape drive, a floppy drive, a hard disk drive or a compact disk drive, a receiver, a transmitter, a speaker, a display, a speech synthesizer, an output port, an input port, a user input device (such as a keyboard, a keypad, a mouse, a microphone and the like)). In one example, the I/O devices 406 include at least two separate communication interfaces. Although only one processor element is shown, it should be noted that the computer may employ a plurality of processor elements. Furthermore, although only one computer is shown in the figure, if the method 300 as discussed above is implemented in a distributed or parallel manner for a particular illustrative example, i.e., the steps of the above method 300, or the entire method 300 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method. In one example, instructions and data for the present module or process 405 for dynamic context distribution (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for dynamic context distribution (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not a limitation. Thus, the breadth and scope of a preferred example should not be limited by any of the above-described exemplary examples, but should be defined only in accordance with the following claims and their equivalents.

What is claimed is:

1. A method for supporting a context associated with a client-server connection between a user and a first virtual machine of a virtual function, the method comprising:
   receiving, by a processor, a notification of a change in a behavior of the user that affects the context associated with the client-server connection between the user and the first virtual machine of the virtual function for a first set of services, wherein the context is supported by the first virtual machine of the virtual function, wherein the context describes the client-server connection, wherein the context comprises one or more of: authentication data, session management data, access control data, and data flow information; and
   reassigning, by the processor, the context to a second virtual machine of the virtual function for a second set of services, the second set of services being different from the first set of services, the second virtual machine being different from the first virtual machine, the reassigning based at least in part on the change in the behavior, wherein the change in the behavior triggers a need for at least one of the second set of services.

2. The method of claim 1, wherein the first set of services of the first virtual machine is only a first service, and the second set of services of the second virtual machine is only a second service that is different from the first service.

3. The method of claim 2, wherein the first service and the second service invoke different signaling call flows and data traffic.

4. The method of claim 1, wherein the first set of services of the first virtual machine is a plurality of services, and the second set of services of the second virtual machine is only a single service that is invoked by the change in the behavior.

5. The method of claim 1, wherein the first set of services of the first virtual machine is no services, and the second set of services of the second virtual machine is only a single service that is invoked by the change in the behavior.

6. The method of claim 1, wherein the change in the behavior comprises a new invocation of an on-demand application.

7. The method of claim 1, wherein the change in the behavior comprises a change in a mobility pattern of the user.

8. The method of claim 1, further comprising:
   notifying, by the processor, the second virtual machine of the reassigning, via an agent function installed on the second virtual machine.

9. The method of claim 1, further comprising:
   notifying, by the processor, a load balancer of the reassigning.

10. The method of claim 1, wherein the method is performed by the virtual function operating independently of another virtual function supporting the context.

11. The method of claim 1, wherein the second virtual machine is configured and includes specialized software to support a specific service.

12. A non-transitory computer-readable storage device storing a plurality of instructions which, when executed by a processor, cause the processor to perform operations for supporting a context associated with a client-server connection between a user and a first virtual machine of a virtual function, the operations comprising:
   receiving a notification of a change in a behavior of the user that affects the context associated with the client-server connection between the user and the first virtual machine of the virtual function for a first set of services, wherein the context is supported by the first virtual machine of the virtual function, wherein the context describes the client-server connection, wherein the context comprises one or more of: authentication data, session management data, access control data, and data flow information; and
   reassigning the context to a second virtual machine of the virtual function for a second set of services, the second set of services being different from the first set of services, the second virtual machine being different from the first virtual machine, the reassigning based at least in part on the change in the behavior, wherein the change in the behavior triggers a need for at least one of the second set of services.

13. The non-transitory computer-readable storage device of claim 12, wherein the first set of services of the first virtual machine is only a first service, and the second set of services of the second virtual machine is only a second service that is different from the first service.

14. The non-transitory computer-readable storage device of claim 13, wherein the first service and the second service invoke different signaling call flows and data traffic.

15. The non-transitory computer-readable storage device of claim 12, wherein the first set of services of the first virtual machine is a plurality of services, and the second set of services of the second virtual machine is only a single service that is invoked by the change in the behavior.

16. The non-transitory computer-readable storage device of claim 12, wherein the first set of services of the first virtual machine is no services, and the second set of services of the second virtual machine is only a single service that is invoked by the change in the behavior.

17. The non-transitory computer-readable storage device of claim 12, wherein the change in the behavior comprises a new invocation of an on-demand application.

18. The non-transitory computer-readable storage device of claim 12, wherein the change in the behavior comprises a change in a mobility pattern of the user.

19. A system comprising:
   a plurality of virtual machines, wherein each of the plurality of virtual machines is configured to support a respective set of services; and
   a hardware controller for monitoring a context associated with a client-server connection between a user and a first one of the plurality of virtual machines for a first set of services that is associated with a virtual function, wherein the context describes the client-server connection, wherein the context comprises one or more of:

authentication data, session management data, access control data, and data flow information, the hardware controller further for assigning the context to a second one of the plurality of virtual machines for a second set of services that is associated with the virtual function based on a current user behavior that affects the context, wherein the current user behavior triggers a need for at least one of the second set of services, the second set of services being different from the first set of services.

20. The system of claim 19, further comprising:
a load balancer communicatively coupled to the controller and to the plurality of virtual machines and maintaining a mapping of a plurality of contexts including the context to the plurality of virtual machines.

* * * * *